Sept. 29, 1942.  G. A. PADDOCK  2,297,019
CELL COVER FOR STORAGE BATTERIES
Filed Sept. 16, 1938
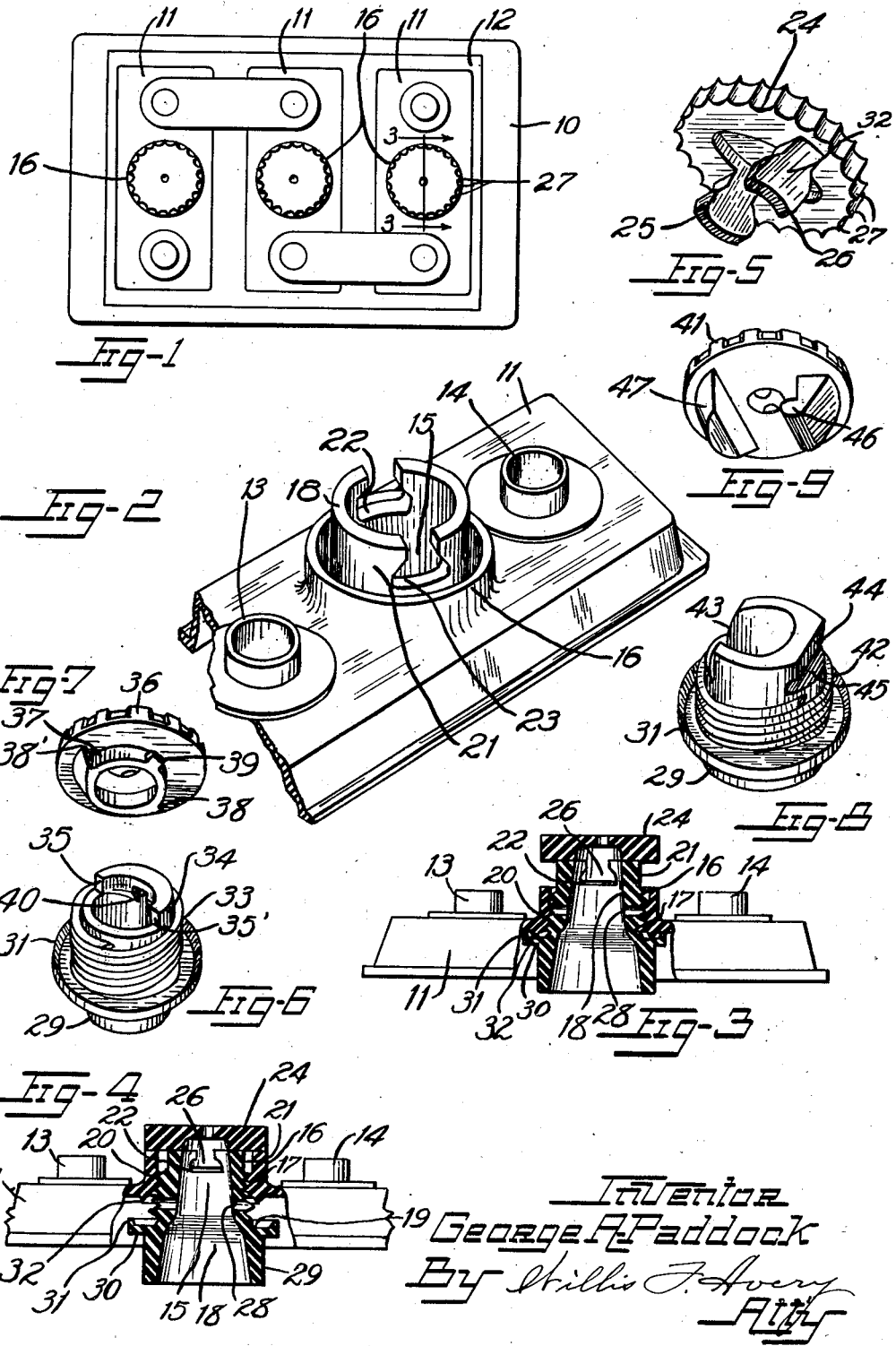
Inventor
George A. Paddock
By Willis F. Avery
Atty Patented Sept. 29, 1942

2,297,019

UNITED STATES PATENT OFFICE 2,297,019

CELL COVER FOR STORAGE BATTERIES

George A. Paddock, Stow, Ohio, assignor to The B. F. Goodrich Company, New York, N. Y., a corporation of New York Application September 16, 1938, Serial No. 230,231

8 Claims. (Cl. 136—178)

This invention relates to cell covers for storage batteries, and is especially useful where control of venting of the cells is desired.

In the use of storage batteries it is desirable to keep the electrolyte at a substantially constant level and it is necessary to the life of the battery that the plate be covered with electrolyte at all times. During charging of the battery, hydrogen gas is given off and carries a quantity of the electrolyte from the cell. The water of the electrolyte also evaporates at all times. This makes it necessary frequently to add water to the cells.

In order to prevent overfilling of the cell, it has been proposed to form the cell cover with a depending skirt around the vent well through which the cell is filled. Overfilling with such a cell cover results in gas becoming trapped above the electrolyte around the vent well, and escape of this gas under the skirt to the vent well is accompanied by slashing and spraying of electrolyte at the vent well. It is desirable to provide means whereby the space surrounding the vent well skirt may be vented above the surface of the electrolyte when the vent plug is in place in the vent well, and to prevent such venting when the plug is removed for filling and testing the cell in order to prevent overfilling and to permit venting when the plug is in place.

The principal objects of this invention are to provide improved means for preventing overfilling of the cell, to provide improved automatic venting of the cell when the vent plug is in place, to provide simplicity of construction, to provide security of operation, and especially to assure correct manipulation of the parts.

These and other objects will appear from the following description and the accompanying drawing.

Of the drawing:

Fig. 1 is a plan view of a three-cell battery.

Fig. 2 is a perspective view of the improved cell cover in its preferred form.

Fig. 3 is a cross sectional view of the cell cover assembly taken on line 3—3 of Fig. 1 with the vent plug in removing position.

Fig. 4 is a similar view with the vent plug in locked position.

Fig. 5 is a perspective view of the vent plug showing the under side thereof.

Fig. 6 is a perspective view of a modified vent well bushing embodying the invention, as seen from above when it is removed from the cell cover.

Fig. 7 is a perspective view of a closure member therefor as seen from below.

Fig. 8 is a view similar to Fig. 6 of a further modified bushing construction, embodying the invention.

Fig. 9 is a view similar to Fig. 7 of a closure member for the well bushing of Fig. 8.

Referring to the drawing, the numeral 10 designates a battery container which is divided by partitions to provide cells, each having a cell cover 11. The cell covers are sealed in place as by bituminous material 12. Each cell cover is of rigid material such as hard rubber or other molded plastic having the proper electrical insulating and acid-resisting properties. Openings 13, 14 are provided to receive the cell terminal posts, and therebetween a filler opening 15 surrounded by a rim 16 integral with the cover and threaded as at 17 to receive a threaded bushing 18 comprising a vertically adjustable vent-well skirt 29 is also provided. Although the threaded mounting is illustrated in the preferred embodiment, other inter-engaging mountings preferably of a slidable construction such for example as a bayonet joint, may be provided if desired.

The bushing 18 is stepped, as at 19 to provide an offset shoulder and is threaded thereabove as at 20 to fit the threads of the vent well. Above the threaded portion 20 is a plain portion 21 of reduced diameter which is formed with a pair of diametrically opposed dove-tail notches to slidably receive the dove-tail lugs 22, 23, the lugs being arcuately and diametrically disposed on the cover so as to be substantially continuations of the wall 21 of the bushing 18 when the lugs 25, 26 are disposed in the notches 22, 23. The arrangement is such that when the bushing 18 has been screwed to its highest position and the shoulder 19 thereon engages thhe under side of the cell cover wall, as in Fig. 3, the vent well cover 24 may be moved radially with respect to the vent well, or perpendicular of the plane of the drawing in Fig. 3, into or out of locked engagement with the bushing 18, and when concentric with the bushing, the bushing may be screwed thereby to its lowest position, as in Fig. 4, where the lugs 25, 26 will be within the vent well flange 16 and removal of the cover 24 in this position is prevented. Rotative movement of the bushing 18 and the cover 24 are in unison, the cover acting as a wrench for the bushing and the two collectively comprising a two piece vent plug. When the cover 24 is removed the axial opening in the bushing is of such size as to permit filling and testing the cell. The skirt 29 limits the rise of the electrolyte so that a gas space will remain between the electrolyte and the cover. When the plug cover and bushing are assembled, the cover is of such diameter as to limit descent of the bushing. To provide for facility of rotation, the cover 24 is corrugated or milled as at 27 around its edge.

Provision for venting of the space around the bushing 18 and between the cell cover 11 and the electrolyte is made as by one or more radial apertures 28 in the wall of the bushing. These are located so as to be exposed below the wall of the cell cover, as in Fig. 4, when the bushing 18 is in its lowest position and therefore effective to vent the space about the bushing to the center of the bushing when the cover 24 is in place and the bushing screwed down. When the bushing is at its uppermost position, as in Fig. 3, the radially aperture portion of the bushing is within the threaded portion of the cell cover, and the apertures are closed preventing exit of gas from the space surrounding the bushing and between the cell cover and the surface of the electrolyte.

This construction has the advantage, among others, that it is necessary to screw the lid and with it the bushing to the same upper position each time it is desired to remove the lid, so that it is virtually impossible for the bushing to become incorrectly positioned in the well by accidental cause, and this is important to assure proper opening and closing of the vent aperture 28 in relation to the filling operation and venting function.

The shoulder 19 extends radially beyond the threads and acts as a sealing means by contact with the cell cover. In order further to assure sealing a radially extending flange 30 may be formed at the shoulder. The flange is provided with a raised rim 31 adapted to confine a quantity of electrolyte above the shoulder which electrolyte accumulates there as a result of splashing. An annular depending rim 32 on the cell cover, concentric with the vent well, and smaller in circumference than the rim 31 is adapted to dip below the rim 31 when the vent well bushing is elevated to seal against leakage of gas toward the threaded portion. The electrolyte entrapped also keeps the threads wet, the fluid being drawn into the threaded space by capillary attraction where it not only lubricates the threads but also assists in preventing escape of gas along the threads.

To provide for automatic centering of the closure member 24, the outer faces 32 of the dovetail lugs 26 are formed conical with the largest diameter at the cover portion so that if assembled off center the conical surfaces will engage the tubular vent bushing and force the closure member to the proper position in alignment with the bushing.

In the modification illustrated in Figs. 6 and 7, the vent well bushing 33 is like that previously described except that its upper plain cylindrical portion 34 instead of being formed with dovetailed notches, is cut away throughout a large portion, preferably 180° of its extent, so as to form radial shoulders 35, 35', and the closure member 36 has a depending annular collar 37 which throughout the complementary 180° of its extent is adapted to fit within the bore of the bushing 33 and throughout the remaining 180° is thickened to form an arcuate portion complementary to the upstanding portion of the cylindrical portion 34, the enlarged portion providing shoulders 38, 38' to engage shoulders 35, 35'.

The outer surface of the thickened portion of the dependent collar is made conical to cooperate with the rim 16 of the cell cover to center the closure member. A radially extending dowel 39 on the collar 37 is adapted to engage a notch 40 in the inner wall of the vent well bushing to act in the manner of a spanner wrench in rotating the parts in unison.

In the modification of Figs. 8 and 9, the closure cap 41 and vent well bushing 42 are adapted to be locked against relative rotative movement but adapted to slidably engage each other radially of the axis of rotation. The cap is also adapted to be manipulated by a limited tipping or hinged motion with respect to the vent well bushing. To accomplish this the upper part of the tubular vent well bushing is relieved in one radial direction by a rebate 43 on one side intersecting the inner wall of the bushing, and on the other side by a rebate 44 of less radial depth and having a hinge groove 45 at its heel to hingedly engage a hinge lug 46 of the closure member slidable endwise therein. The closure member also has a lug 47 for engaging the rebate 43. Both lugs are conically tapered on their outer surfaces to assist in centering the closure member with the vent well bushing by engagement with the rim 16 on the cell cover. When the vent well bushing is turned to is most elevated position, the cap 41 may be removed by a radial movement or the cap may be tilted on its hinge lug without complete removal.

In all three embodiments illustrated the cap or lid cannot be removed from the bushing by direct axial lifting, but requires some movement in another direction for separation to occur. This feature makes it necessary for the bushing to be moved to its upper position before the lid can be removed for filling so that the vent will be sealed, as hereinbefore described.

Various modifications may be made without departing from the scope of the invention as it is defined by the following claims.

I claim:

1. A cover assembly for a container for electrolyte comprising a cover having an opening therethrough, a filler well structure bodily movable in said opening in a vertical direction and having a portion depending below the cover for providing a gas-trapping space adjacent said well structure and between the cover and a normal electrolyte level, said well structure having a vent aperture in the wall thereof so located as to be in communication with said space when said well structure is in its lowered position and to be closed by said cover when said well structure is in its raised position, and a vented closure element having means for detachably engaging the closure element with said well structure by radial movement with relation thereto only in the raised position of said well structure and for interlocking them for axial movement together for positively manipulating said well structure in a vertical direction between said lowered and raised positions.

2. A cover assembly for a container for electrolyte comprising a cover having an opening therethrough, a filler well structure bodily movable in said opening in a vertical direction and having a portion depending below the cover for providing a gas-trapping space adjacent said well structure and between the cover and a normal electrolyte level, said well structure having a vent aperture in the wall thereof so located as to be in communication with said space when said well structure is in its lowered position and to be closed by said cover when said well structure is in its raised position, a stop for limiting upward movement of said well structure, and a vented closure element having means for detachably engaging the closure element with said well structure by radial movement with relation thereto only in the raised position of said well structure and for interlocking them for axial movement together for positively manipulating said well structure in a vertical direction between said lowered and raised positions.

3. A cover assembly for a contaner for electrolyte comprising a cover having a threaded opening therethrough, a threaded filler well structure bodily movable in said opening in a vertical direction and having a portion depending below the cover for providing a gas-trapping space adjacent said well structure and between the cover and a normal electrolyte level, said well structure having a vent aperture in the wall thereof so located as to be in communication with said space when said well structure is in its lowered position and to be closed by said cover when said well structure is in its raised position, and a vented closure element having means for detachably engaging the closure element with said well structure by radial movement with relation thereto only in the raised position of said well structure and for interlocking them for axial movement together for positively manipulating said well structure in a vertical direction between said lowered and raised positions.

4. A cover assembly for a container for electrolyte comprising a cover having an opening therethrough, a filler well structure bodily movable in said opening in a vertical direction and having a portion depending below the cover for providing a gas-trapping space adjacent said well structure and between the cover and a normal electrolyte level, said well structure having a vent aperture in the wall thereof so located as to be in communication with said space when said well structure is in its lowered position and to be closed by said cover when said well structure is in its raised position, a vented closure element having means for detachably engaging the element with said well structure for axial movement together for positively manipulating the well structure in a vertical direction between said lowered and raised position while permitting separation of said closure element from said well structure in the raised position of the latter, and sealing means on said well structure and cover to seal the gas space when the well structure is in its raised position, said sealing means comprising an upwardly facing annular shoulder on said well structure providing an annular face opposing a face on the under side of said cover and an annular rib on at least one of said faces.

5. A cover assembly comprising a cover having an opening therethrough, a filler well structure bodily movable in said opening in a vertical direction and having a portion depending below the cover for providing a gas-trapping space adjacent said well structure beneath the cover, said well structure having a vent aperture in the wall therethrough of adapted to be in communication with said space when said well structure is in its lowered position and to be closed by said cover when said well structure is in its raised position, means for sealing said well structure to said cover in the raised position of the well structure, the sealing means comprising an upwardly facing shoulder on the depending portion of said well structure and annular ribs on said shoulder and the underside of the cover.

6. A cover assembly comprising a cover having an opening therethrough, a filler well structure bodily movable in said opening in a vertical direction and having a portion depending below the cover for providing a gas-trapping space adjacent said well structure beneath the cover, said well structure having a vent aperture in the wall thereof adapted to be in communication with said space when said well structure is in its lowered position and to be closed by said cover when said well structure is in its raised position, means on said depending portion of said well structure for sealing said structure to said cover in the raised position of the structure, the sealing means comprising an upwardly facing annular shoulder on the depending portion of said well structure, an annular groove for liquid in said shoulder, and an annular ridge on said cover for reception in said groove in the raised position of said well structure.

7. A cover assembly comprising a cover having an opening therethrough, a filler well structure bodily movable in said opening in a vertical direction and having a portion depending below the cover for providing a gas-trapping space adjacent said well structure beneath the cover, said well structure having a vent aperture in the wall thereof adapted to be in communication with said space when said well structure is in its lowered position and to be closed by said cover when said well structure is in its raised position, means on the depending portion of said well structure for providing with said cover a liquid trap for sealing the well structure to the cover at its raised position, and a vented closure element removably engageable with said well structure for moving the structure between said lowered and raised positions.

8. A closure device for battery boxes adapted to contain electrolyte up to a predetermined level and having at its top a cover with a hole therein, there being a gas-receiving space below the cover, said closure device comprising a hollow sleeve movable vertically in the hole in the cover, means for supporting the sleeve in an upper and a lower position in the cover, the upper end of said sleeve being provided with vent passages through its wall, and sealing means on the sleeve below the vent passages adapted to form an air-tight joint with the under surface of the cover for preventing the passage of gas from the gas-receiving space to the vent passages through the hole in said cover when the sleeve is in its upper position and with the lower part of the sleeve extending downwardly below said sealing means to the predetermined level of the electrolyte, and a vertically movable vent cap for covering the upper end of the sleeve, said cap being constructed to separably engage the sleeve and move the same downwardly to its lower position to disengage the sealing means from the under surface of the cover and put the vent passages in communication with the gas-receiving space.

GEORGE A. PADDOCK.